(12) United States Patent
Zeng et al.

(10) Patent No.: US 9,098,144 B1
(45) Date of Patent: Aug. 4, 2015

(54) ADAPTIVE AMBIENT LIGHT AUTO-MOVEMENT BLOCKING IN OPTICAL NAVIGATION MODULES

(75) Inventors: Ke-Cai Zeng, Fremont, CA (US);
Yansun Xu, Mountain View, CA (US);
John Frame, Arcadia, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 545 days.

(21) Appl. No.: 13/428,320

(22) Filed: Mar. 23, 2012

Related U.S. Application Data

(60) Provisional application No. 61/566,995, filed on Dec. 5, 2011.

(51) Int. Cl.
*G06F 3/042* (2006.01)

(52) U.S. Cl.
CPC .................................... *G06F 3/0421* (2013.01)

(58) Field of Classification Search
None
See application file for complete search history.

(56) References Cited

U.S. PATENT DOCUMENTS

| 6,495,832 | B1 | 12/2002 | Kirby |
| 7,166,966 | B2 | 1/2007 | Naugler et al. |
| 7,456,815 | B2 | 11/2008 | Reime |
| 2008/0191630 | A1 | 8/2008 | Peng |
| 2009/0109126 | A1 | 4/2009 | Stevenson et al. |
| 2010/0119124 | A1 | 5/2010 | Satyan |
| 2011/0141020 | A1 | 6/2011 | Raynor |
| 2012/0098792 | A1* | 4/2012 | Lum et al. ............... 345/175 |

FOREIGN PATENT DOCUMENTS

| CN | 201773384 | 3/2011 |
| WO | 2010002900 A | 1/2010 |

OTHER PUBLICATIONS

Ahsanullah, et al._Design and Implementation of Multi-Touch System Using FTIR Technique for Optimization of Finger Touch Detection_Dated 2010_7 pages.
Johannes Schoning, Jonathan Hook, Tom Bartindale, Dominik Schmidt, Patrick Oliver_Building Interactive Multi-Touch Surfaces_23 pages.
Search Report for U.S. Appl. No. 13/428,320, Dated Mar. 2012, 8 pages.

* cited by examiner

*Primary Examiner* — David D Davis

(57) ABSTRACT

Embodiments of optical navigation modules (ONM) and methods of operating the same to block auto-movement due to ambient light are described. Generally, the method includes: (i) collecting a plurality of PD signal samples from a photodiode (PD) in an optical navigation module (ONM); (ii) determining a peak-to-peak variation ($\Delta PD$) in the plurality of PD signal samples; (iii) comparing the peak-to-peak variation ($\Delta PD$) to a specified threshold peak-to-peak variation ($\Delta PD_{SPEC}$); and (iv) if $\Delta PD$ is less than $\Delta PD_{SPEC}$, suppressing reporting of motion data derived from signals from a photodetector array (PDA) in the ONM to block auto-movement in an output from the ONM. Other embodiments are also described.

15 Claims, 12 Drawing Sheets

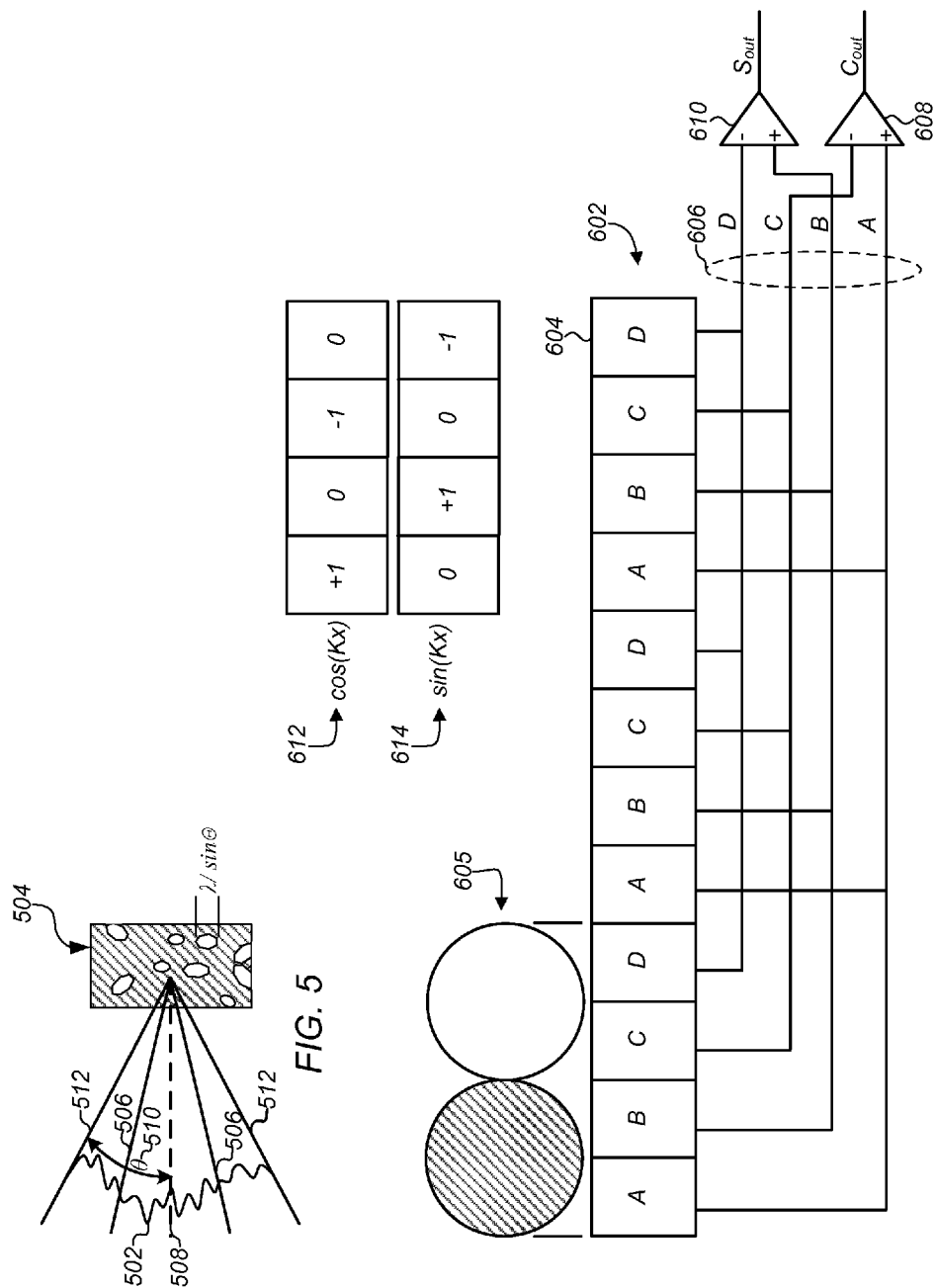

US 9,098,144 B1

ADAPTIVE AMBIENT LIGHT AUTO-MOVEMENT BLOCKING IN OPTICAL NAVIGATION MODULES

RELATED APPLICATIONS

This application claims the benefit of priority under 35 U.S.C. 119(e) to U.S. Provisional Patent Application Ser. No. 61/566,995, filed Dec. 5, 2011, which is incorporated by reference herein.

TECHNICAL FIELD

The present disclosure relates generally to the field of optical navigation modules, and more particularly to optical finger navigation modules and methods of operating the same to suppress auto-movement due to ambient light.

BACKGROUND

Optical finger navigation (OFN) modules are becoming increasingly common in data processing systems, such as cellular telephones, tablet computers, electronic readers and portable entertainment or game systems for data input and/or cursor movement. OFN modules include optical navigation sensors (ONS), which generally include a light source to illuminate a tracking surface, such as a finger or stylus in contact with a surface of the OFN module, and a sensor, such as a charge-coupled device (CCD), complementary metal-oxide-semiconductor (CMOS) imaging array, or a photodiode array, to capture an image or signal in light reflected from the surface. A tracking program implemented in a signal processor coupled to the sensor analyzes successive images or signals to determine displacement of the optical navigation module relative to the surface.

One problem with existing OFN modules is that the ONS cannot differentiate between light reflected from a finger or stylus and environmental or ambient light. Strong ambient light can cause spurious cursor motions known as auto-movements. Sunlight is a particular problem, and manufacturers usually requires that the OFN module pass strict sunlight tests with specified range of light intensity conditions, test time, test angle, orientations relative to the sunlight. Prior approaches to addressing the problem of auto-movement focused on mechanical solutions in an attempt to block the sunlight. This has not been convenient, cost effective, or entirely effective since sunlight is inevitably transmitted through a window of the OFN module.

BRIEF DESCRIPTION OF THE DRAWINGS

These and various other features of methods of optical navigation modules configured for adaptive ambient light auto-movement blocking will be apparent upon reading of the following detailed description in conjunction with the accompanying drawings and the appended claims provided below, where:

FIG. 5 illustrates a speckle pattern in light returned from an optically rough surface;

FIG. 6 illustrates a schematic block diagram of a speckle based linear or one-dimensional (1D) comb-array for use in an ONS of an OFN module configured for adaptive ambient light auto-movement blocking;

DETAILED DESCRIPTION

Figure 1A:
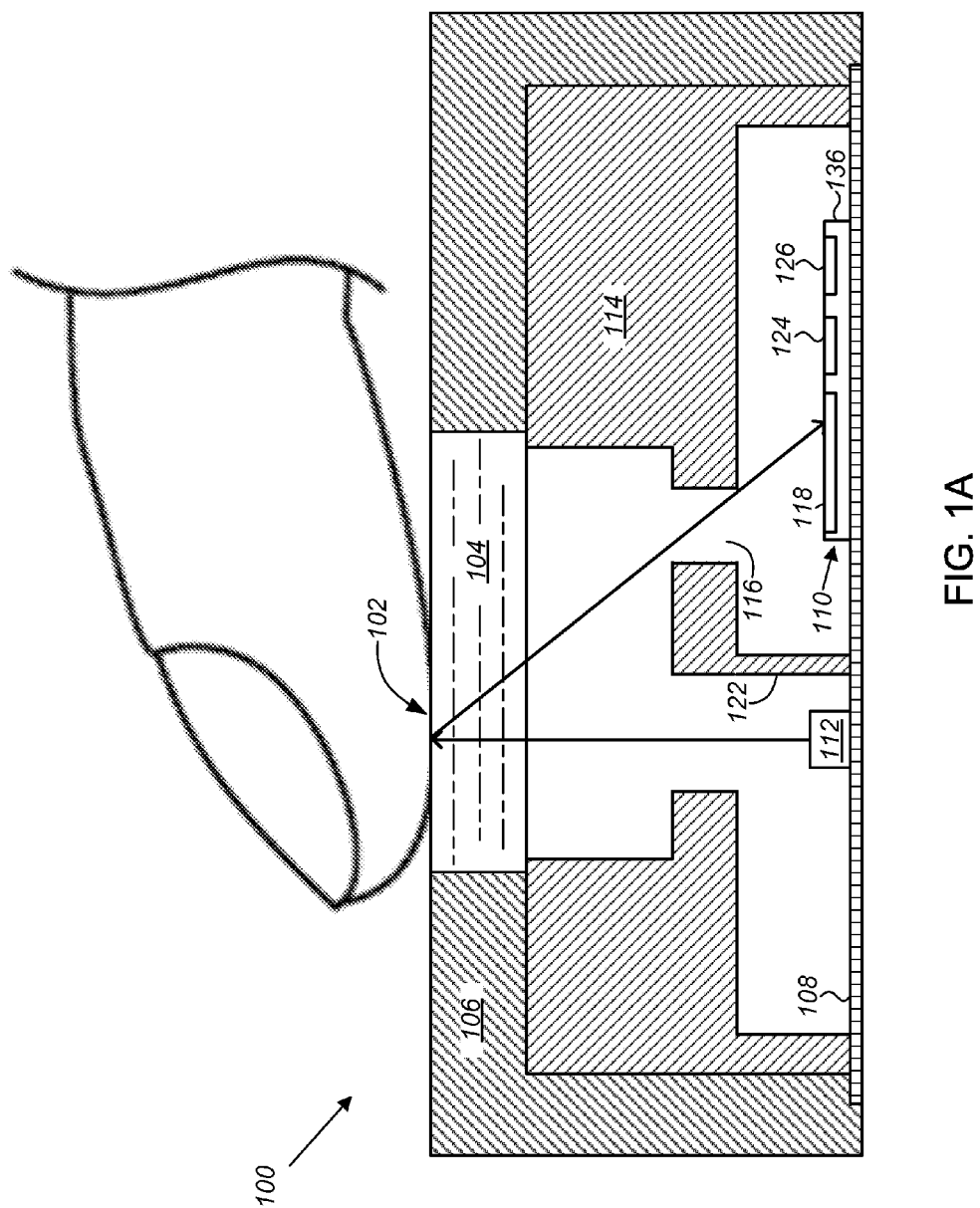
FIG. 1A is a block diagram of an embodiment of an optical finger navigation (OFN) module configured for adaptive ambient light auto-movement blocking.

Optical navigation modules (ONM) and methods of operating the same to track relative movement between the module and a tracking surface while blocking auto-movement due to ambient light are provided. In one embodiment, the method includes: (i) collecting a plurality of photodiode (PD) signal samples from a PD in the ONM; (ii) determining a peak-to-peak variation ($\Delta$PD) in the plurality of PD signal samples; (iii) comparing the peak-to-peak variation ($\Delta$PD) to a specified lower threshold peak-to-peak variation ($\Delta PD_{SPEC}$); and (iv) if $\Delta$PD is less than $\Delta PD_{SPEC}$, suppressing reporting of motion data derived from signals from a photodetector array (PDA) in the ONM to block auto-movement in an output from the ONM. In one version of this embodiment, the method further includes: (i) determining a number ($N_T$) of the plurality of PD signal samples from the PD that fall between an upper target ($TPD_{High}$) and a lower target ($TPD_{Low}$) for signal samples from the PD; and (ii) if $N_T$ is less than a fraction of a total number (N) of the plurality of PD signal samples from the PD, suppressing reporting of motion data derived from signals from the PDA to block auto-movement in the output from the ONM.

Embodiments of the ONM and methods of operating the same to block auto-movement in an output from the ONM will now be described with reference to the accompanying drawings. The drawings described are only schematic and are non-limiting. In the drawings, the size of some of the elements may be exaggerated and not drawn to scale for illustrative purposes. The dimensions and the relative dimensions may not correspond to actual reductions to practice of the invention. For purposes of clarity, many details of input devices and methods of operation in general, and ONM and optical finger navigation (OFN) modules in particular, which are widely known and not relevant to the present apparatus and method, have been omitted from the following description.

Figure 1B:
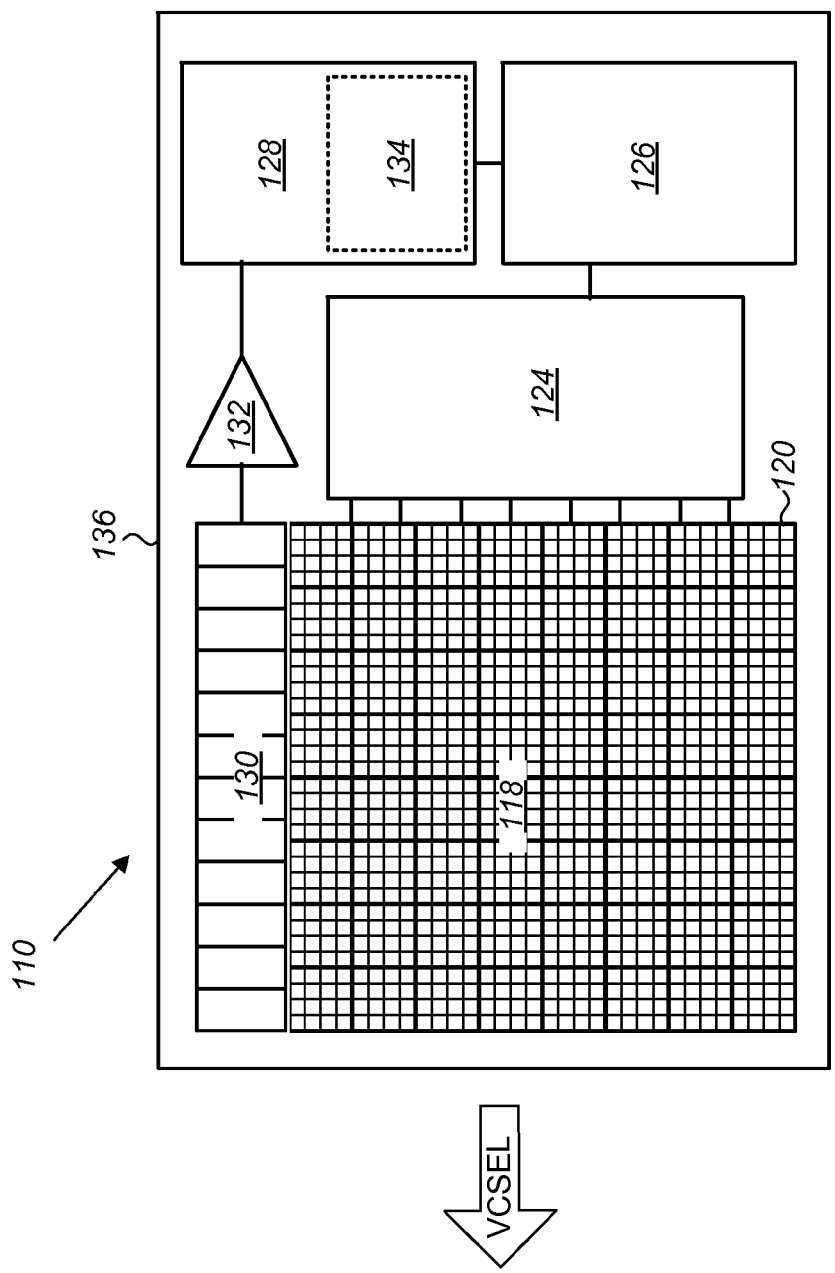
FIG. 1B is a block diagram illustrating a top view of an embodiment of an optical navigation sensor (ONS) of the OFN module of FIG. 1A.

In one embodiment, shown in FIG. 1A, the optical navigation module (ONM) includes an optical finger navigation (OFN) module 100 and is adapted or configured for sensing relative movement of a tracking surface 102 (such as the surface of a finger, stylus, palm, glove, or any suitable object) over an opening or a window 104, which is optically transparent to the wavelength of the light source 112 of the OFN module. Referring to FIGS. 1A and 1B, the OFN module 100 includes an enclosure or housing 106 containing the window 104, and a substrate or printed circuit board 108 to which an optical navigation sensor (ONS 110) and an illuminator or light source 112, such as, but not limited to, a light emitting diode (LED) or a laser diode such as a vertical-cavity surface-emitting laser (VCSEL) diode, is mounted. In the embodiment shown, the OFN module 100 further includes an aperture component 114 including an aperture 116 through which light is propagated from the tracking surface 102 to a photo-detector array (PDA 118) of a plurality of photosensitive elements 120, such as photodiodes, in the ONS 110, and a light baffle 122 separating the light source 112 from the PDA. By photodetector array it is meant an array of sensors of light or other electromagnetic energy capable of generating either current or voltage proportional to the light incident thereon. By propagated it is meant the transmission or movement of light from the tracking surface 102 onto the PDA 118 is the result of either scattering or reflection of light from the tracking surface.

In addition to the PDA 118, the ONS 110 includes front-end electronics 124 for couple signals out from the PDA 118, and signal processing and interface circuitry (collectively referred to as signal processor 126) for translating changes in a light pattern propagated onto the PDA from the tracking surface 102 into motion data, and a programmable controller 128 to control operation of the ONS.

Referring to FIG. 1B, the ONS 110 further includes a photodiode (PD) 130 and a PD amplifier 132, such as a transimpedance amplifier (TIA), and a program embedded in firmware or memory 134 of the programmable controller 128 to cut-off or to block data representing motion of the OFN module relative to the tracking surface from an output of the OFN module when auto-movement is detected. By auto-movement it is meant spurious or false motion data induced by ambient light incident on the PDA 118 when the OFN module 100 is exposed to an ambient light environment, such as sunlight.

The PD 130 can include, for example, a single large area photodiode (LAPD), or a number of small sized photo-diodes physically wired together, to receive or detect light passing through the aperture 116 in OFN module 100 onto the PD, and to generate a current signal in response thereto. Alternatively, the photo-diodes can be discrete and not wired together, but the output of each can be added in the controller 128 to give a measure of the total incident light. The PD amplifier 132 converts the current signal from the PD 130 into a voltage signal that is digitized and converted in the programmable controller 128 into a number of counts per unit of time.

Components of the ONS 110 can be integrally formed as a single integrated circuit (IC 136), as shown FIGS. 1A and 1B, or can include one or more ICs or discrete components packaged within a common multi-chip module (MCM) or package, or can be separately mounted to the printed circuit board 108. In addition, while the PD 130 is shown in FIG. 1B as being physically separate from the PDA 118, it is noted that this does not need to be the case, and in some embodiments the PD can include or be composed of a number of photosensitive elements 120 located in a contiguous area of the PDA 118.

Figure 1C:
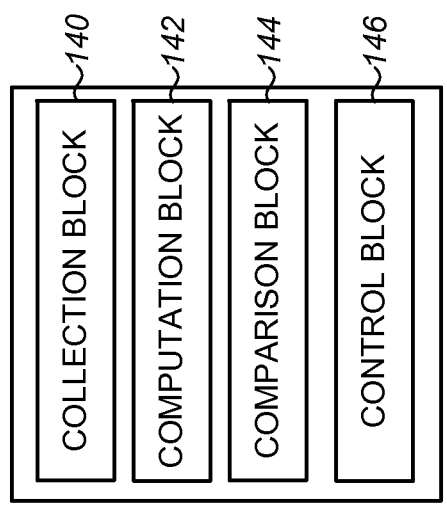
FIG. 1C is a block diagram illustrating an embodiment of a program embedded in a controller of the ONS of FIG. 1B to suppress auto-movement.

Referring to FIG. 1C, the program embedded in the memory 134 of the programmable controller 128 can include an input or collection block 140 including computer-readable code or instructions for collecting a moving block of signal samples from the PD 130. A computation block 142 includes computer-readable instructions for identifying or computing maximum and minimum values in the signal samples, computing a peak-to-peak variation ($\Delta PD$) from these maximum and minimum values, and the number ($N_T$) of signal samples falling between previously defined upper target and lower target for PD signals ($TPD_{high}$ and $TPD_{low}$ respectively). A comparison block 144 including computer-readable instructions for comparing the peak-to-peak variation of the signal samples ($\Delta PD$) to previously defined lower thresholds for peak-to-peak PD signal variation ($\Delta PD_{SPEC}$ respectively). An output or control block 146 including computer-readable instructions for instructing the programmable controller 128 to cut-off or to interrupt data representing motion of the OFN module 100 relative to the tracking surface 102 when results of the comparisons performed in the comparison module 144 indicate auto-movement is detected. In particular, the control block 146 will suppress motion data if either the peak-to-peak variation of the signal samples ($\Delta PD$) is less than the lower specified threshold for peak-to-peak PD signal variation ($\Delta PD_{SPEC}$), or if the number of signal samples falling between the upper and lower target for PD signals ($TPD_{high}$ and $TPD_{low}$) is less than a previously defined fraction or percent of the total number of signal samples (N). For example, if $N_T/N$ is less than 10%.

Figure 2A:
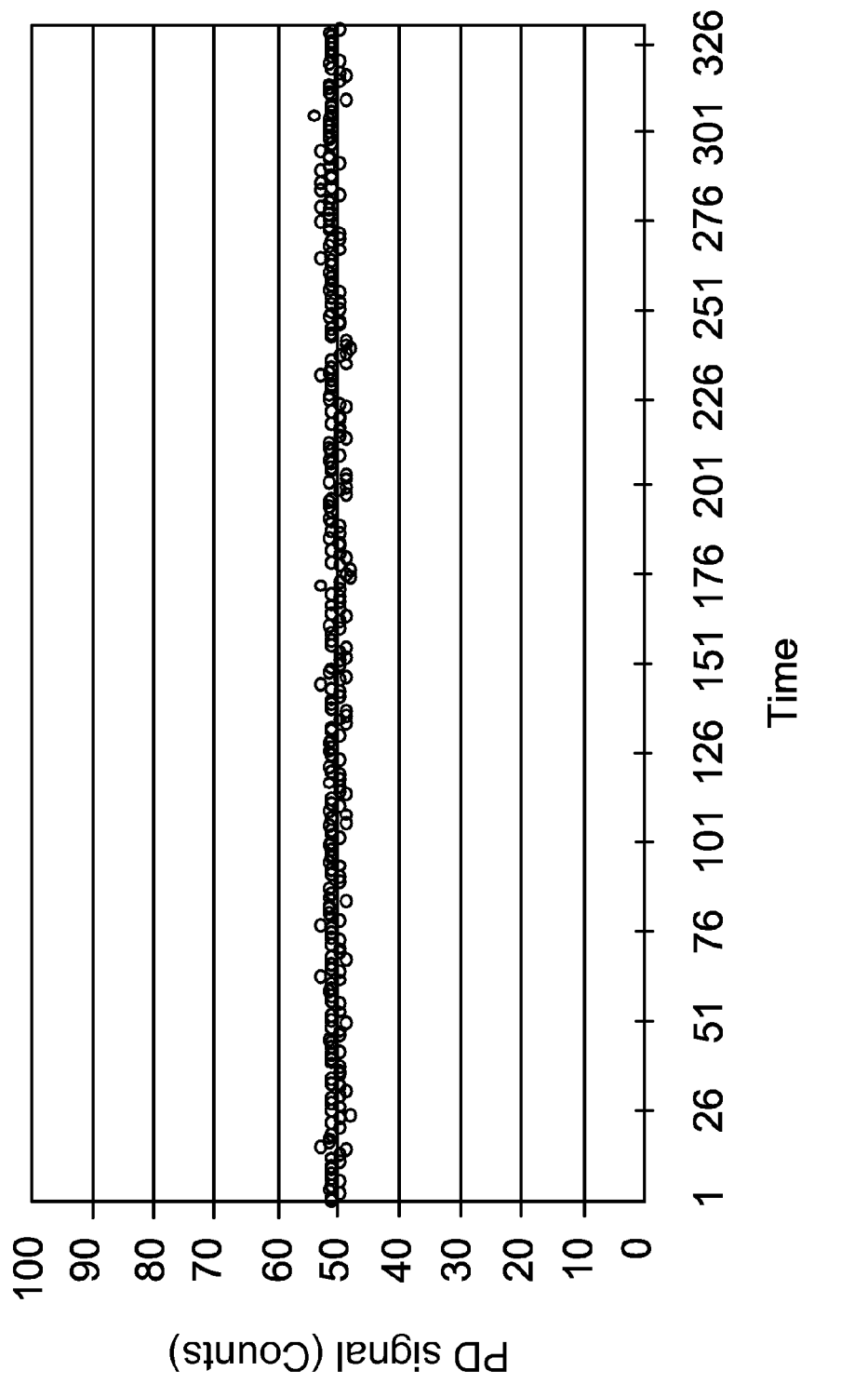
FIGS. 2A and 2B are plots of characteristics of photodiode (PD) signals induced by ambient light incident on a PD in an embodiment of an ONS.
Figure 2B:
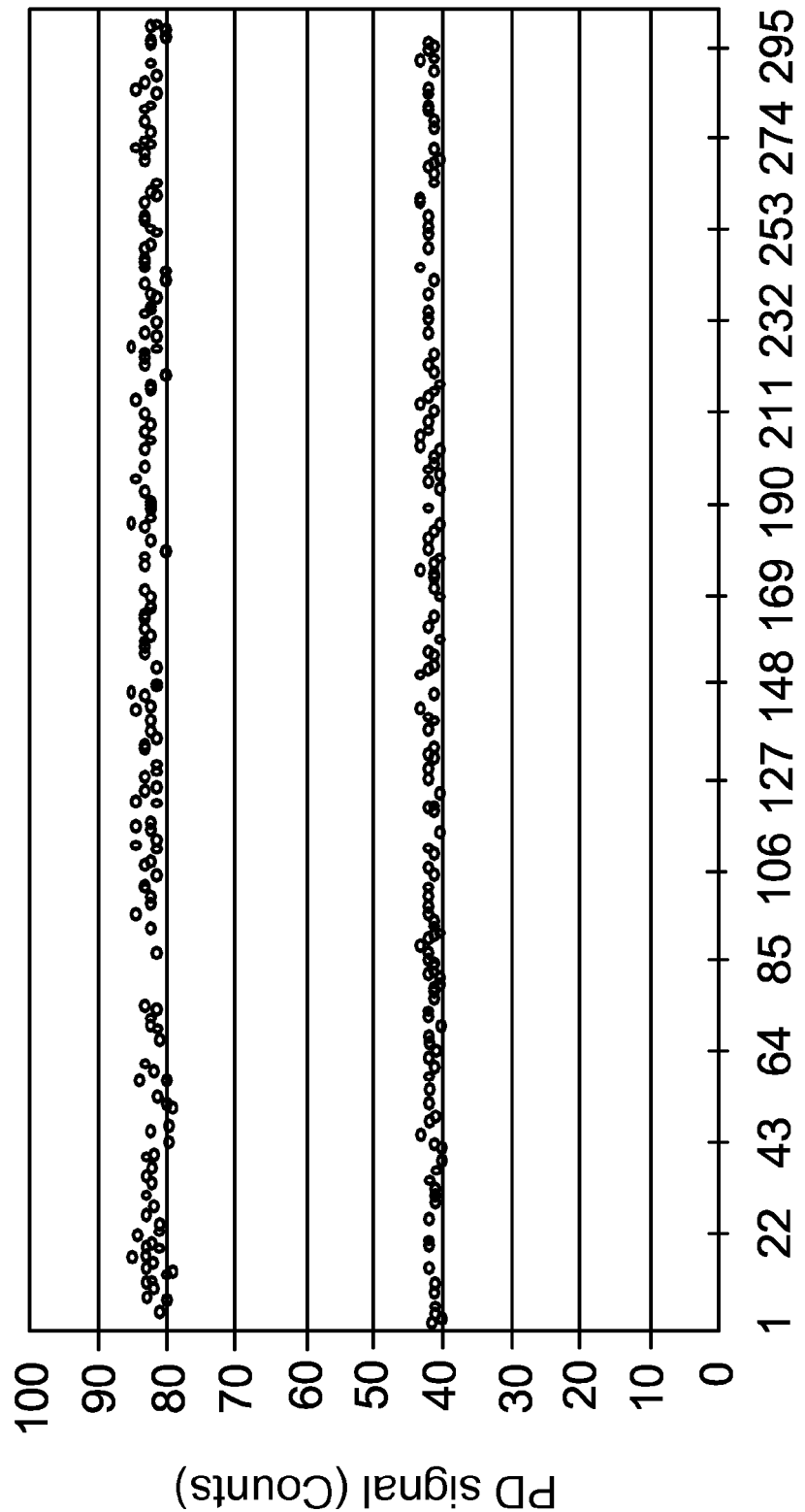

FIGS. 2A and 2B are plots of characteristics of PD signals induced by ambient light incident on the PD 130. Referring to FIG. 2A, it is noted that characteristics of a plurality of PD signal samples for one type of PD signal induced by ambient light incident on the PD 130 include a relatively weak current signal from the PD, as indicated by a count level of about 50, and is relatively stable with a very small peak-to-peak variation of the signal samples ($\Delta PD$), ranging from about 0 to about 6 counts.

Referring to FIG. 2B, characteristics for another type of PD signal induced by ambient light incident on the PD 130 reveals a split into two groupings of PD signal samples, and is almost binary or bimodal, hopping between two groups including a first group of low count level of about 40, and a second group of relatively high count levels of about 80. Because of the split into two groups the peak-to-peak variation of the signal samples ($\Delta PD$) is large, typically greater than several tens of counts.

Figure 3:
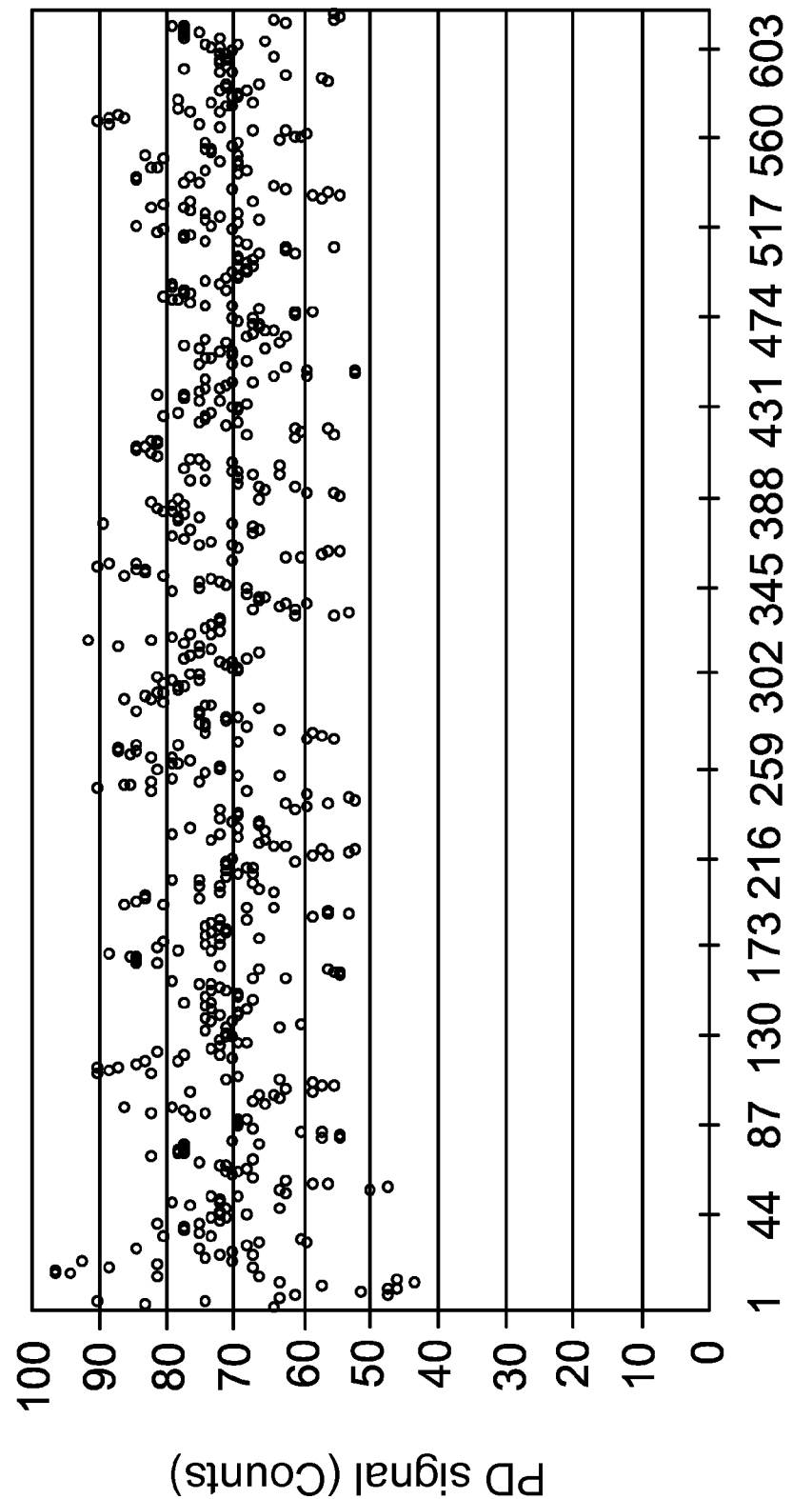
FIG. 3 is a plot of characteristics of PD signals induced by light reflected from a finger in motion relative to an embodiment of an OFN module configured for adaptive ambient light auto-movement blocking.

FIG. 3 is a plot of characteristics of PD signals induced by light reflected from a finger in motion relative to an embodiment of an OFN module configured for adaptive ambient light auto-movement blocking. Referring to FIG. 3, it is noted that there are fundamental differences in the characteristics of the PD signal samples induced by ambient light and that due to normal finger motion. In contrast to the plots of PD signal samples induced by ambient light shown in FIGS. 2A and 2B, it is noted that the PD signal samples of FIG. 3 are distributed more randomly around a mean value with variations ($\Delta PDs$) spread over a larger range than the ambient-light induced PD signals. In addition, for finger motion induced PD signal samples, the peak-to-peak variation of the signal samples ($\Delta PD$) is relatively large, typically 8 to several tens of counts, and is random in nature. Thus, it will be understood that by defining upper ($TPD_{High}$) and lower target ($TPD_{Low}$) for the PD signal samples, of the number ($N_T$) of signal samples falling between $TPD_{high}$ and $TPD_{low}$ expressed as a fraction or percentage of the total number (N) of PD signal samples, and lower specified threshold peak-to-peak variation ($\Delta PD_{SPEC}$), it is possible to identify and block or suppress auto-movement induced by ambient light incident on the PDA 118.

Figure 4:
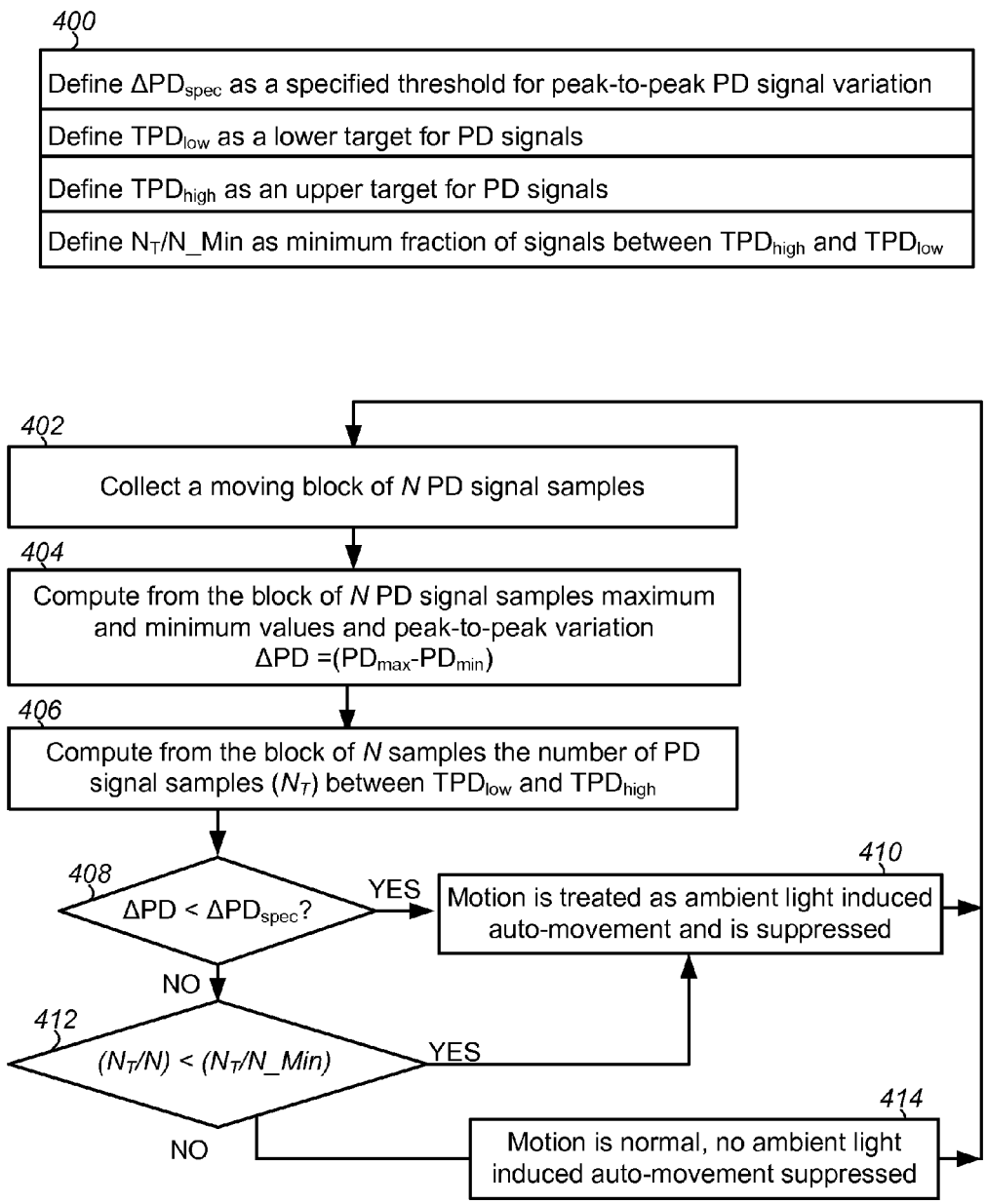
FIG. 4 is a flow chart of an embodiment of a method for operating an OFN module configured for adaptive ambient light auto-movement blocking.

FIG. 4 is a flow chart of an embodiment of a method for operating an OFN module configured for adaptive ambient light auto-movement blocking. Referring to FIG. 4 the method begins with defining and assigning values to upper ($TPD_{high}$) and lower targets ($TPD_{low}$) for the PD signal samples, and lower thresholds for peak-to-peak variation ($\Delta PD_{SPEC}$) of the PD signal samples (module 400). In one exemplary embodiment, $TPD_{high}$ can include a count of about 90, $TPD_{low}$ can include a count of about 50, $\Delta PD_{SPEC}$ can include a count of less than about 10. A moving block of a number (N) of PD signal samples is collected (module 402), and maximum and minimum values and a peak-to-peak variation in the number of PD signal samples is computed (module 404). The number of PD signal samples ($N_T$) between $TPD_{low}$ and $TPD_{high}$ from the block of N PD signal samples is computed (module 406). Next, $\Delta PD$ is compared to $\Delta PD_{SPEC}$ (module 408). If $\Delta PD$ is less than $\Delta PD_{SPEC}$, it is treated as ambient light induced and motion derived from signals from the PDA are suppressed to block auto-movement (module 410). If $\Delta PD$ is not less than $\Delta PD_{SPEC}$, a fraction or percent of signal samples falling between $TPD_{high}$ and $TPD_{low}$ ($N_T/N$) is compared to a previously defined minimum fraction ($N_T/N\_Min$) (module 412). In one exemplary embodiment, the previously defined fraction or percent can be about 10%. If $N_T/N$ is less than the previously defined minimum fraction, it is treated as ambient light induced and motion derived from signals from the PDA are suppressed to block auto-movement (module 410). If $N_T/N$ is greater than the previously defined fraction or percent, it is treated as being induced by light reflected from a tracking surface onto the PD, and motion derived from signals from the PDA are not suppressed (module 414).

In one embodiment, the ONS 110 is a speckle-based ONS. However, it will be understood that the system and method of the present disclosure is not so limited, and can be adapted to any type of ONS, including, for example, correlation based ONS, which use successive images of an illuminated tracking surface to determine the direction, distance and speed it is moved relative to the ONS.

Operating principles of a speckle-based ONS will now be described with reference to FIG. 5. For purposes of clarity, many of the details of speckle-based ONS, which are widely known and not relevant to the present invention, have been omitted from the following description.

Referring to FIG. 5, any general surface with morphological irregularities of dimensions greater than the wavelength of the incident light (i.e. roughly >1 µm) will tend to scatter light 502 into a complete hemisphere in approximately a Lambertian fashion. If a coherent light source, such as a laser is used, the spatially coherent light returned from the surface will create a complex interference pattern upon detection by a square-law detector with finite aperture. This complex interference pattern of light and dark areas is referred to as speckle or a speckle pattern 504. As shown in FIG. 5, the contribution for the measured speckle pattern 504 comes from rays 506 between the surface normal 508 and the extreme rays 512. Speckle is the random interference pattern generated by scattering of coherent light off a rough surface and detected by an intensity photosensitive element, such as a photodiode, with a finite angular field-of-view or numerical aperture (NA). The detailed nature of the speckle pattern depends on the surface topography, and the wavelength of light scattered therefrom. A translational speckle pattern resulted from a moving rough surface can be employed to identify any relative motion between the ONS and the surface as it is displaced transversely to the ONS.

A speckle sensitive photodetector array can include one or more linear or one-dimensional (1D) or a two-dimensional (2D) comb-array having multiple detectors or photosensitive elements arranged in a two-dimensional configuration.

A linear or 1D comb-array is an array having multiple photosensitive elements that are connected in a periodic manner, so the array acts as a fixed template that integrates one spatial frequency component of the signal. An embodiment of one such 1D comb-array is shown in FIG. 6. The connection of multiple photosensitive elements in a periodic manner enables the comb-array to serve effectively as a correlator at one spatial frequency K (defined by a pitch of the photosensitive elements in the array and the collection optics). FIG. 4 shows a general configuration (along one axis) of a 1D comb-array 602 of photosensitive elements, such as photodiodes 604, wherein the combination of interlaced groups of photosensitive elements serves as a periodic filter on spatial frequencies of light-dark signals 605 produced by the speckle (or non-speckle) images. In the embodiment shown, the 1D comb-array 602 consists of a number of photodiode sets or periods, each having four of photodiodes 604, labeled here as A, B, C, and D. Currents or signals from corresponding or similarly labeled photodiodes 604 in each period are electrically connected (wired sum) to form four line signals 606 coming out from the array 602. Background suppression and signal accentuation is accomplished by using first differential analog circuitry 608 to generate an in-phase differential current signal, labeled here as $C_{out}$, and second differential analog circuitry 610 to generate a quadrature differential current signal, labeled here as $S_{out}$. Comparing the phase of the in-phase and quadrature signals permits determination of the magnitude and direction of motion of the 1D comb-array 602 relative to a scattering surface.

Referring to FIG. 6, the in-phase $C_{out}$ and the quadrature $S_{out}$ signals are obtained by taking the underlying speckle pattern and processing them according to the cosine and sine templates, 612 and 614 respectively. The ONS may be designed so that an optical "light-dark" signal pattern, i.e., speckle, has a size substantially equal to the period of the comb-array—four (4) photodiodes 604 or pixels in the embodiment of FIG. 6. The in-phase signal current is obtained from $C_{out}=A-C$, and the quadrature signal current from $S_{out}=B-D$ as shown in FIG. 6.

Figures 7A, 7B:
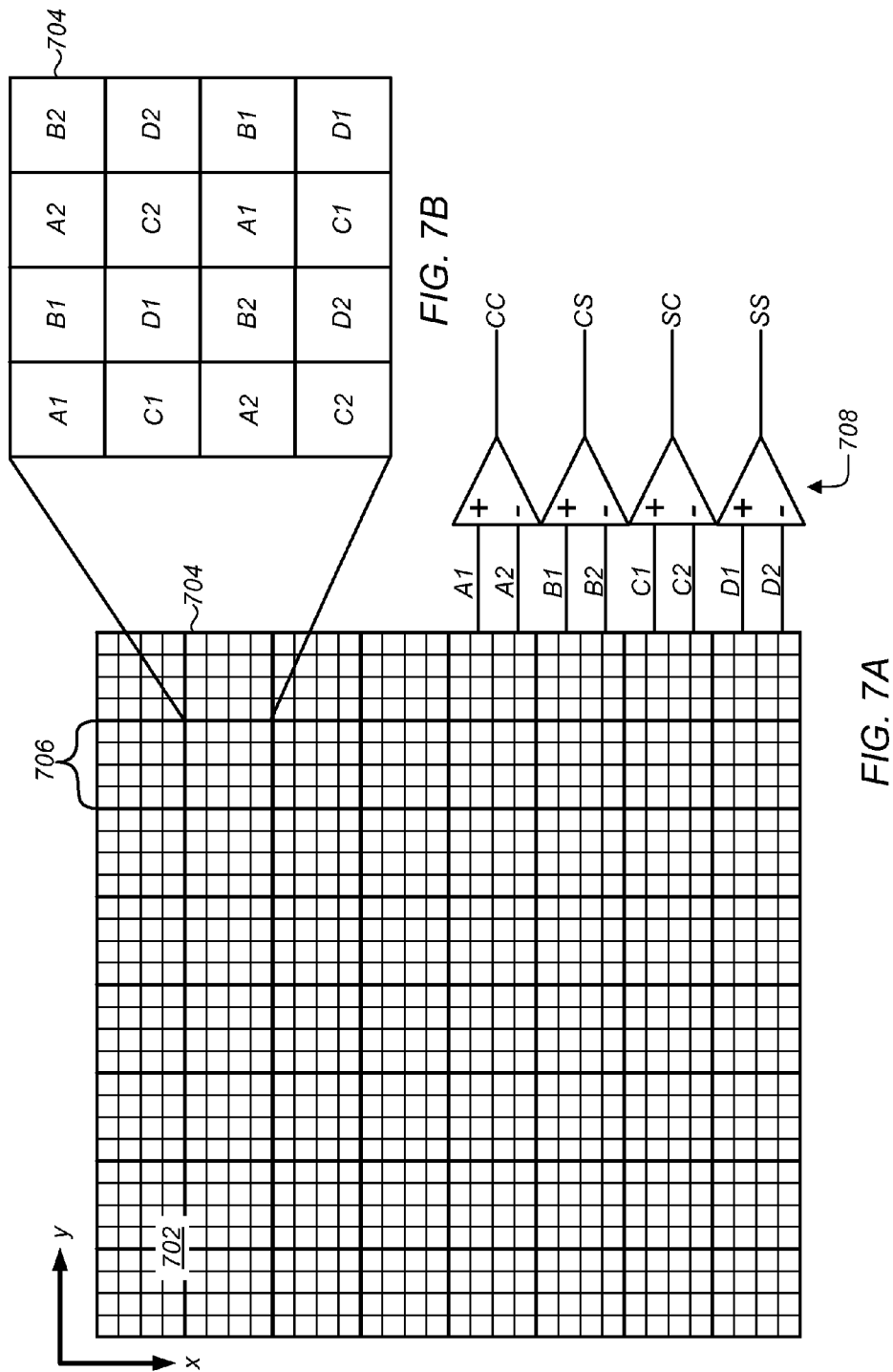
FIGS. 7A and 7B illustrates schematic block diagrams of a two-dimensional (2D) comb-array for use in an ONS of an OFN module configured for adaptive ambient light auto-movement blocking.

In one embodiment the photodetector array includes photodiodes or photosensitive elements are arranged in two dimensions (2D), as shown in FIGS. 7A and 7B. The performance of the 2D comb-array is expected to be superior to the 1D×1D case since each point in the image, in the average, traverses a much longer path inside the 2D detector active area in all directions and therefore contributes more to the displacement estimation. FIGS. 7A and 7B are schematic block diagrams of a 2D comb-array having photosensitive elements grouped in a 4×4 elements-per-cell configuration. Referring to FIGS. 7A and 7B, the 2D comb-array 702 may have multiple photosensitive elements 704 arranged or grouped into cells 706, each cell having photosensitive elements grouped in a 4×4 elements-per-cell (or 4×4 elements/period) configuration. Photosensitive elements 704 within a cell 706 with the same letter and same number, as shown in the detail of FIG. 5B, as well as corresponding elements of all cells in the 2D comb-array 702 with the same number, are electrically connected or wired-sum to yield eight signals A1 through D2. The eight wired-sum signals are further combined with differential amplifiers 708 to provide four signals containing the in-phase and quadrature information in the x and y directions.

Implementations and Alternatives

Figure 8:
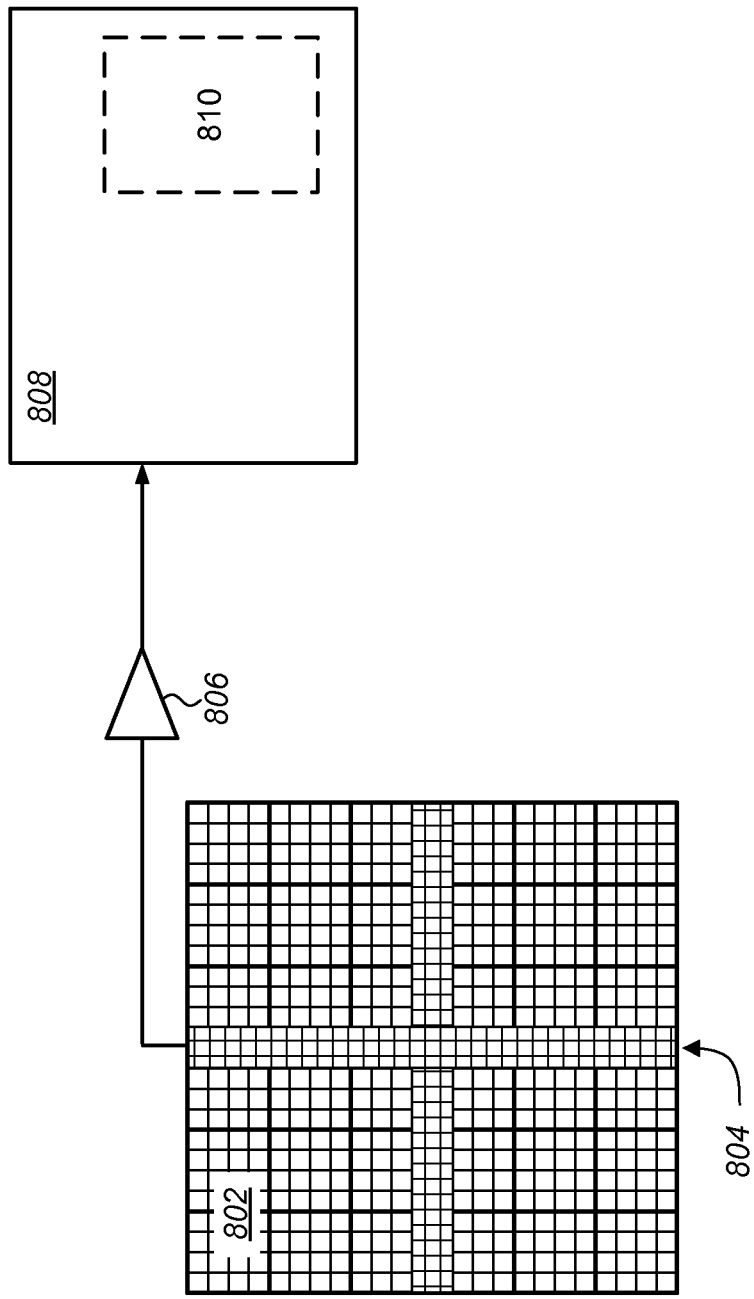
FIG. 8 illustrates schematic block diagrams of an ONS of an OFN module configured for adaptive ambient light auto-movement blocking according to another embodiment.

In an alternative embodiment, shown in FIG. 8, in which the photodetector array (PDA 802) includes an array of photodiodes, the PD 804 can include, one or more photodiodes located in a contiguous area of the PDA and electrically coupled through a PD amplifier 806 to a programmable controller 808 with a program embedded in firmware or memory 810 to cut-off or to block data representing motion of the OFN module relative to the tracking surface from an output of the OFN module when auto-movement is detected.

Figure 9:
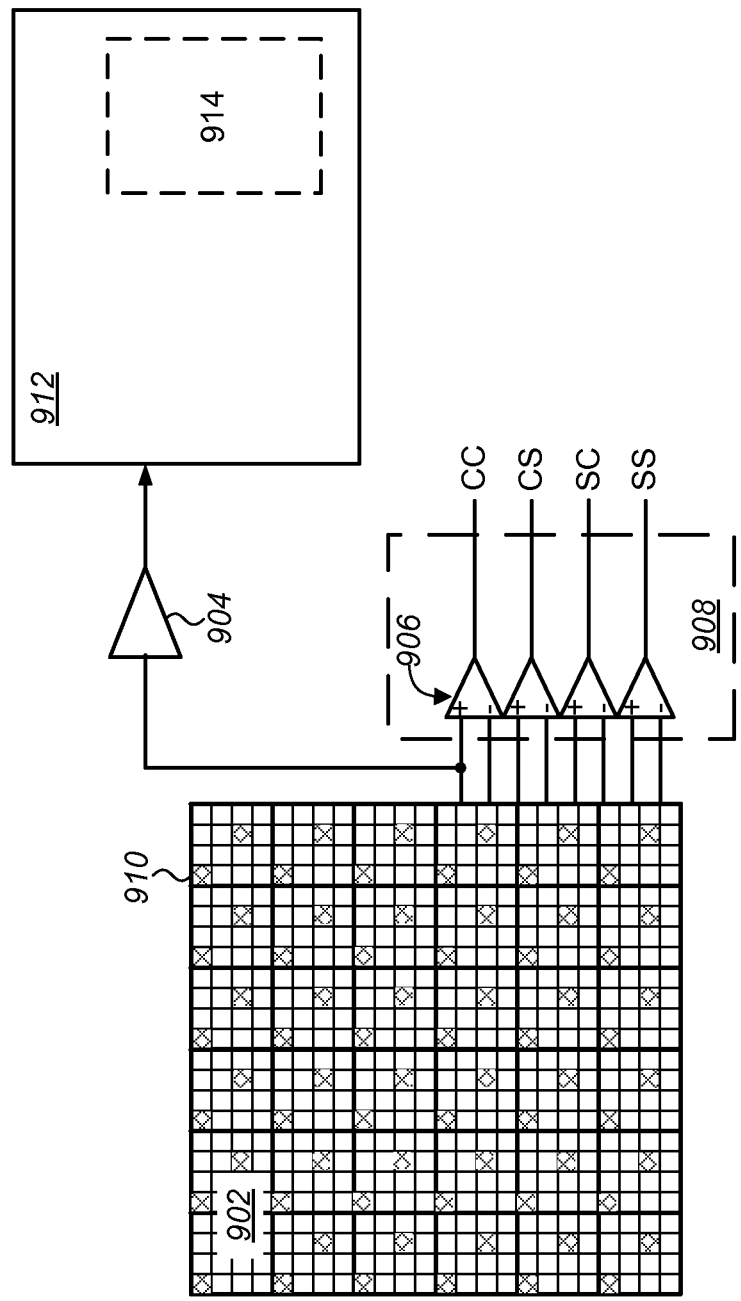
FIG. 9 illustrates schematic block diagrams of an ONS of an OFN module configured for adaptive ambient light auto-movement blocking according to yet another embodiment.

In another embodiment, shown in FIG. 9, in which the photodetector array (PDA 902) includes an array of photodiodes, a PD amplifier 904 can be coupled in parallel with differential amplifiers 906 of a signal processor 908 to one or more shared PDs 910 in the PDA. By shared PDs 910, it is meant PDs with outputs that are electrically coupled directly to the PD amplifier 904 and to differential amplifiers 906 of the signal processor 908. As with embodiments described above, the shared PDs 910 are electrically coupled through the PD amplifier 904 to a programmable controller 912 with a program embedded in firmware or memory 914 to cut-off or to block data representing motion of the OFN module relative to the tracking surface from an output of the OFN module when auto-movement is detected.

Figure 10:
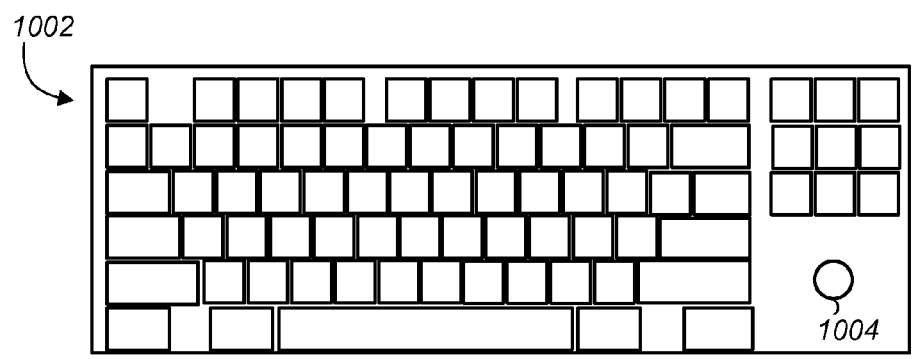
FIG. 10 illustrates an embodiment of an OFN module according to the present disclosure integrated into a keyboard of a personal computer (PC) or workstation.

In one embodiment, shown in FIG. 10, the OFN module may be integrated into a case or keyboard 1002 of a personal computer (PC) or notebook computer. The OFN module generally includes an opening or optically transparent window 1004 in or through a surface of the keyboard 1002 through which the OFN module, senses relative movement and or gestures of a tracking surface, such as a finger, a stylus, a palm, or other suitable object. As described above, the OFN module includes a PD or LAPD, circuitry, a programmable controller and a program embedded in firmware in the controller to block auto-movement in an output from the OFN.

Figure 11:
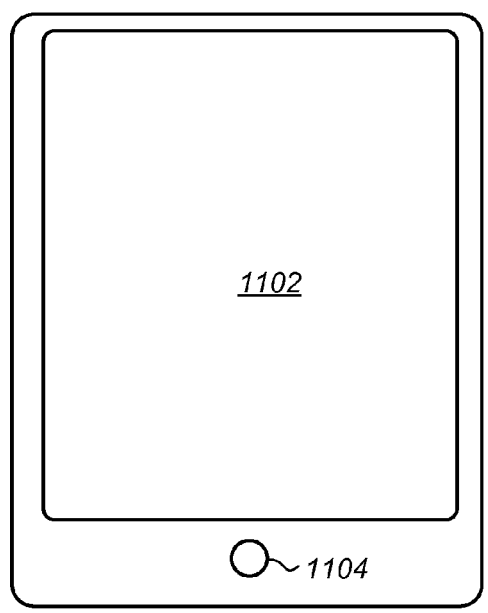
FIG. 11 illustrates an embodiment of an OFN module according to the present disclosure integrated into a tablet PC.

In another embodiment, shown in FIG. 11, the OFN module is housed within and used with a digital reader or tablet computer 1102. Referring to FIG. 11 in this embodiment the OFN module is located or housed beneath an optically transparent window 1104 in or through a surface of the tablet computer 1102 through which the OFN module, senses relative movement and or gestures of a tracking surface, such as a finger, palm, or stylus. As described above, the OFN module includes a PD or LAPD, circuitry, a programmable controller and a program embedded in firmware in the controller to block auto-movement in an output from the OFN.

Figure 12:
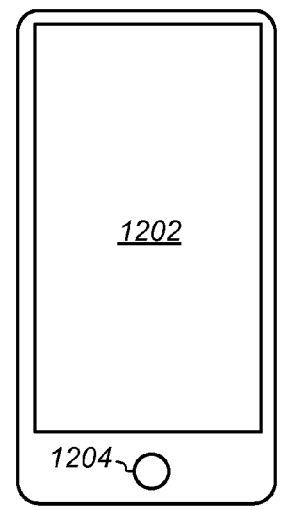
FIG. 12 illustrates an embodiment of an OFN module according to the present disclosure integrated into a cellular telephone or handheld electronic device.

In still another embodiment, shown in FIG. 12, the OFN is housed within and used with a mobile or handheld electronic device 1202, such as cellular telephone, a game controller, remote pointing device or personal digital assistant. Referring to FIG. 12 in this embodiment the OFN generally includes an optically transparent window 1204 in or through a surface of the handheld electronic device 1202 through which movement between the OFN and an object, i.e., a finger, on or proximal to the window is sensed. As described above, the OFN module includes a PD or LAPD, circuitry, a programmable controller and a program embedded in firmware in the controller to block auto-movement in an output from the OFN.

Thus, embodiments of an optical navigation module and methods for operating the same to block auto-movement in an output from the optical navigation module have been described. Although the present disclosure has been described with reference to specific exemplary embodiments, it will be evident that various modifications and changes may be made to these embodiments without departing from the broader spirit and scope of the disclosure. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of one or more embodiments of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

In the forgoing description, for purposes of explanation, numerous specific details have been set forth in order to provide a thorough understanding of the automovement suppression system and method of the present disclosure. It will be evident however to one skilled in the art that the present interface device and method may be practiced without these specific details. In other instances, well-known structures, and techniques are not shown in detail or are shown in block diagram form in order to avoid unnecessarily obscuring an understanding of this description.

Reference in the description to "one embodiment" or "an embodiment" means that a particular feature, structure, or characteristic described in connection with the embodiment is included in at least one embodiment of the system or method. The appearances of the phrase "one embodiment" in various places in the specification do not necessarily all refer to the same embodiment. The term "to couple" as used herein may include both to directly electrically connect two or more components or elements and to indirectly connect through one or more intervening components.

What is claimed is:

1. A method comprising:
   collecting from a photo diode (PD) in an optical navigation module (ONM) a plurality of PD signal samples;
   determining a peak-to-peak variation ($\Delta PD$) in the plurality of PD signal samples;
   comparing $\Delta PD$ to a specified threshold peak-to-peak variation ($\Delta PD_{SPEC}$); and
   if $\Delta PD$ is less than $\Delta PD_{SPEC}$, suppressing reporting of motion data derived from signals from a photo detector array (PDA) in the ONM to block auto-movement in an output from the ONM.

2. The method of claim 1, further comprising:
   determining a number ($N_T$) of the plurality of PD signal samples from the PD that fall between an upper target ($TPD_{High}$) and a lower target ($TPD_{Low}$) for signal samples from the PD; and
   if $N_T$ is less than a fraction of a total number (N) of the plurality of PD signal samples from the PD, suppressing reporting of motion data derived from signals from the PDA in the ONM to block auto-movement in the output from the ONM.

3. The method of claim 2, wherein the fraction is 10% of N.

4. The method of claim 1, wherein the plurality of PD signal samples from the PD comprise a moving block of a number (N) of signal samples.

5. The method of claim 1, wherein the ONM is an optical finger navigation (OFN) module in which relative motion between a finger and the OFN module, and is sensed by signals from the PDA induced by light reflected from the finger onto the PDA.

6. The method of claim 5, wherein plurality of PD signal samples from the PD include signals induced by light reflected from the finger onto the PD or signals induced by ambient light incident on the PD.

7. The method of claim 5, wherein the ONM is speckle-based, and wherein sensing relative motion between the finger and the OFN module comprises sensing changes in an interference pattern created by light scattered from the finger onto the PDA.

8. The method of claim 1, wherein the PDA comprises an array of photo diodes, and wherein the PD from which the plurality of PD signal samples are collected comprises a photo diode in the array of photodiodes.

9. A method comprising:
  collecting a plurality of PD signal samples from a photo diode (PD) in an optical navigation module (ONM);
  determining a peak-to-peak variation (~PD) in the plurality of PD signal samples;
  and determining a number ($N_T$) of the plurality of PD signal samples from the PD that fall between an upper target ($TPD_{High}$) and a lower target ($TPD_{Low}$) for signal samples from the PD; and
  if $N_T$ is less than a fraction of a number (N) of the plurality of PD signal samples from the PD, suppressing reporting of motion data derived from signals from a photo detector array (PDA) in the ONM to block auto-movement in an output from the ONM.

10. The method of claim 9, wherein the fraction is 10% of N.

11. The method of claim 9, wherein the plurality of PD signal samples from the PD comprise a moving block of N signal samples.

12. The method of claim 9, wherein the ONM is an optical finger navigation module (OFN) module in which relative motion between a finger and the OFN module, is sensed by signals from the PDA induced by light reflected from the finger onto the PDA.

13. The method of claim 12, wherein plurality of PD signal samples from the PD include signals induced by light reflected from the finger onto the PD or signals induced by ambient light incident on the PD.

14. The method of claim 12, wherein the ONM is speckle-based, and wherein sensing relative motion between the finger and the OFN module comprises sensing changes in an interference pattern created by light scattered from the finger onto the PDA.

15. The method of claim 12, further comprising comparing ΔPD to a specified threshold peak-to-peak variation ($ΔPD_{SPEC}$), and if ΔPD is less than ΔPDSPEC, suppressing reporting of motion data derived from signals from the PDA in the ONM to block auto-movement in the output from the ONM.

* * * * *